(12) United States Patent
Nam et al.

(10) Patent No.: US 7,781,738 B2
(45) Date of Patent: Aug. 24, 2010

(54) DIGITAL X-RAY IMAGE DETECTOR USING AN FED DEVICE

(75) Inventors: Sang Hee Nam, 101-402 Yoowon Apt., Sajik-dong, Dongnae-gu, Busan 607-120 (KR); Ji Koon Park, Gyeongsangnam-do (KR); Sung Kwang Park, Busan (KR); Jang Yong Choi, Busan (KR); Sang Sik Kang, Gyeongsangnam-do (KR); Byung Youl Cha, Gyeongsangnam-do (KR); Sung Ho Cho, Busan (KR); Gi Won Jang, Gyeongsangnam-do (KR); Jin Yeong Kim, Gyeongsangnam-do (KR); Dae Hwan Kim, Gyeongsangnam-do (KR); Kyu Hong Lee, Busan (KR); Kyoung Jun Yoon, Gyeongsangbuk-do (KR)

(73) Assignee: Sang Hee Nam, Busan (KR)

( * ) Notice: Subject to any disclaimer, the term of this patent is extended or adjusted under 35 U.S.C. 154(b) by 0 days.

(21) Appl. No.: 11/815,193

(22) PCT Filed: Feb. 1, 2006

(86) PCT No.: PCT/KR2006/000355
§ 371 (c)(1),
(2), (4) Date: Jul. 31, 2007

(87) PCT Pub. No.: WO2006/083109
PCT Pub. Date: Aug. 10, 2006

(65) Prior Publication Data
US 2008/0135766 A1   Jun. 12, 2008

(30) Foreign Application Priority Data
Feb. 1, 2005   (KR) .................... 10-2005-0009000

(51) Int. Cl.
G01T 1/20   (2006.01)

(52) U.S. Cl. .................................. 250/361 R

(58) Field of Classification Search .............. 250/361 R
See application file for complete search history.

(56) References Cited

U.S. PATENT DOCUMENTS

| | | | |
|---|---|---|---|
| 5,021,705 A * | 6/1991 | Yamamoto et al. | 313/106 |
| 5,669,690 A | 9/1997 | Hodson et al. | |
| 5,739,522 A * | 4/1998 | Ouimette | 250/214 VT |
| 6,078,643 A * | 6/2000 | Vogelsong et al. | 378/98.2 |
| 2004/0007988 A1* | 1/2004 | Barger et al. | 315/169.3 |
| 2004/0200972 A1* | 10/2004 | Nam et al. | 250/370.11 |

FOREIGN PATENT DOCUMENTS

| | | |
|---|---|---|
| JP | 8-214241 A | 8/1996 |
| JP | 9-45952 A | 2/1997 |
| JP | 11-211832 A | 8/1999 |

* cited by examiner

*Primary Examiner*—David P Porta
*Assistant Examiner*—Mindy Vu
(74) *Attorney, Agent, or Firm*—Birch, Stewart, Kolasch & Birch, LLP

(57) ABSTRACT

Disclosed is a digital X-ray image detector using an FED, including an upper substrate and a lower substrate disposed to face each other; an anode formed beneath the upper substrate; a photoconductive layer formed beneath the anode for forming electron-hole pairs using X-rays; a cathode formed on the lower substrate; an emitter formed on the cathode for emitting electrons of the cathode; a gate electrode formed on an insulating layer provided around the emitter on the cathode; and a data processing part for converting information about the electron-hole pairs formed in the photoconductive layer by the X-rays, transferred from the anode, to digital data through signal processing including filtering, amplification, storage, or A/D conversion. The high performance digital X-ray image detector of this invention has a high image resolution and a large area, is easy to manufacture and process compared to conventional processes, and has excellent detection efficiency of electrical signals.

13 Claims, 2 Drawing Sheets

[Fig. 1]
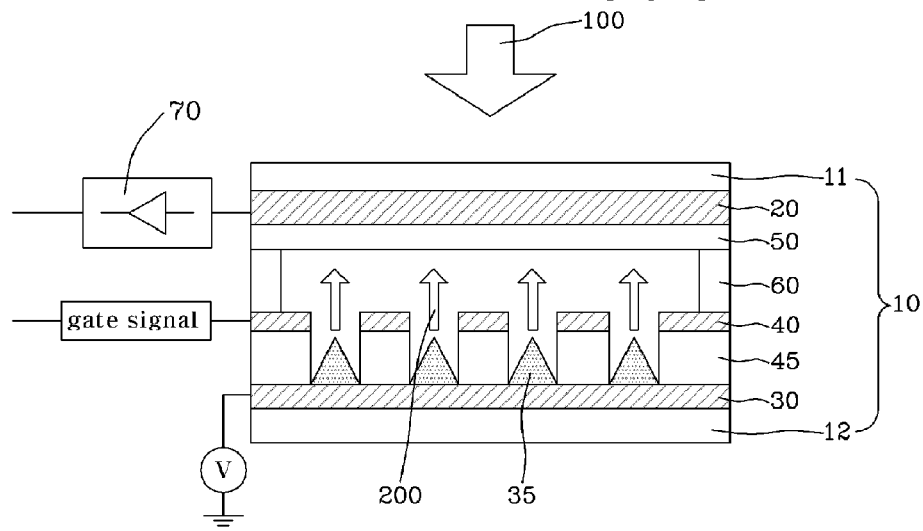
[Fig. 2]
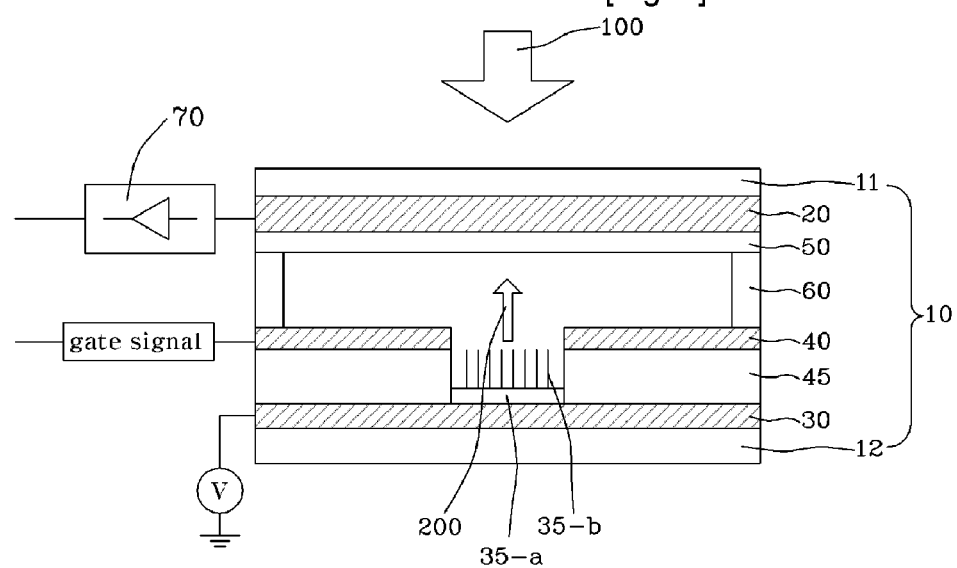
[Fig. 3]
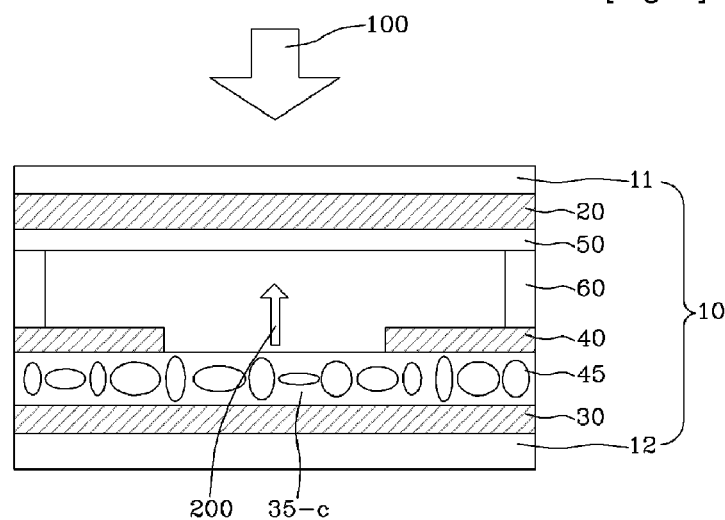

[Fig. 4]
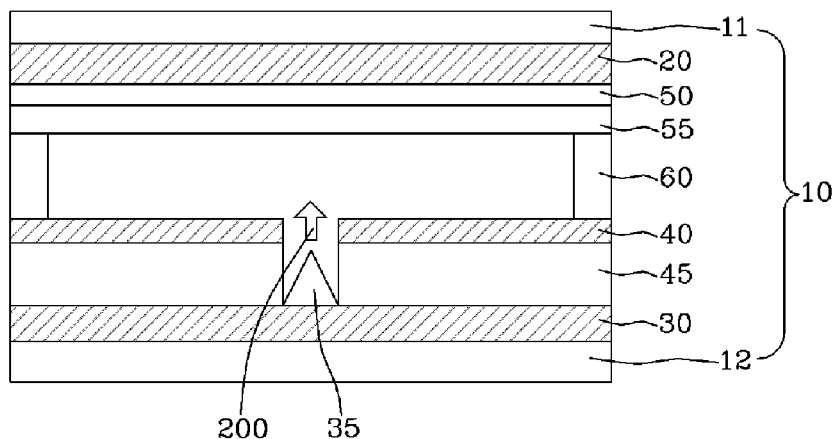
[Fig. 5]
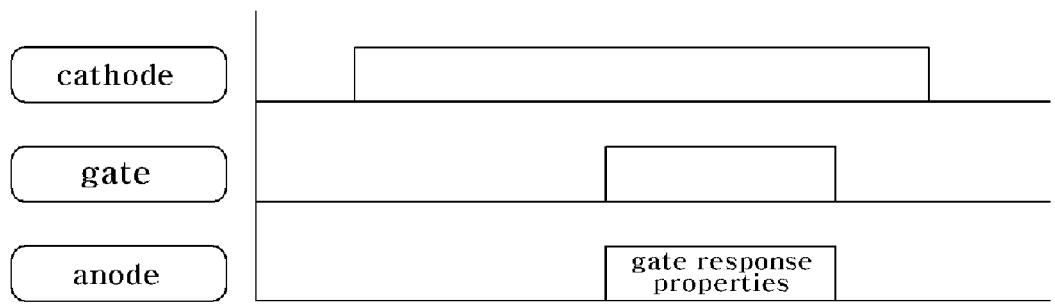
[Fig. 6]
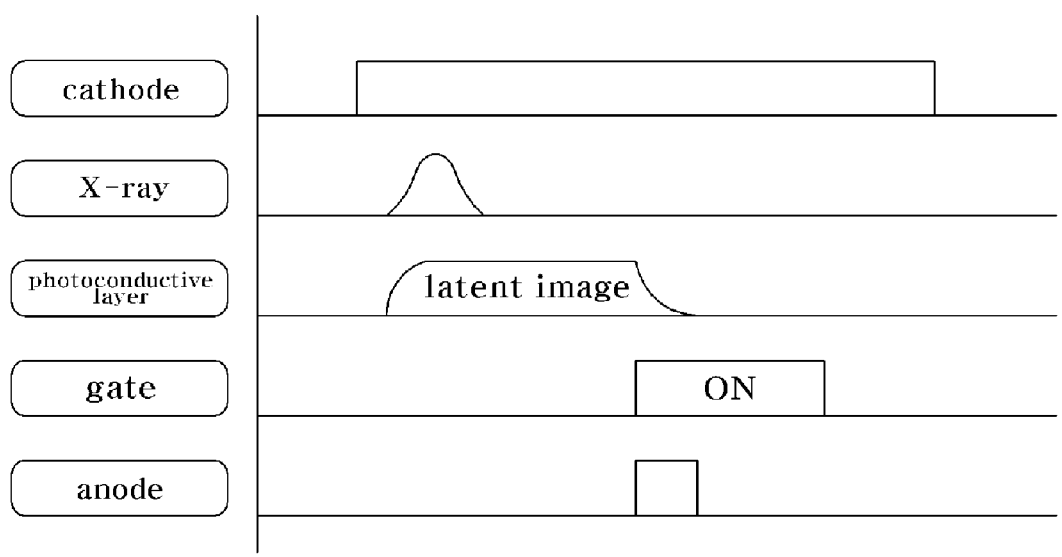

DIGITAL X-RAY IMAGE DETECTOR USING AN FED DEVICE

TECHNICAL FIELD

The present invention relates to a digital X-ray image detector using an FED device, comprising an upper substrate and a lower substrate, which are disposed to face each other and are sealed; an anode formed beneath the upper substrate; a photoconductive layer formed beneath the anode for forming electron-hole pairs using X-rays; a cathode formed on the lower substrate; an emitter formed on the cathode for emitting electrons of the cathode; a gate electrode formed on an insulating layer that is provided around the emitter on the cathode for applying an electron emission control signal to the emitter such that the signal of the electron-hole pairs formed in the photoconductive layer by the X-rays is transferred to the anode; and a data processing part for receiving information about the electron-hole pairs formed in the photoconductive layer by the X-rays from the anode using electrons emitted through the emitter, and then converting the information about the electron-hole pairs to digital data through signal processing including filtering, amplification, storage, or A/D conversion.

BACKGROUND ART

Generally, a digital X-ray image detector is a device for detecting radiation passing through the human body in order to obtain desired image information, in which the image information of the radiation is converted into electrical signals, and the converted electrical signals are detected.

According to conventional techniques, such a digital X-ray image detector, which has been developed to overcome various problems of a screen-film system, is composed of an X-ray receptor layer for forming electron-hole pairs by radiation, electrode layers formed on the upper and lower surfaces of the X-ray receptor layer, and a readout unit formed on a physical base substrate of the X-ray receptor layer for converting electrical signals of the X-ray receptor layer into image information.

The conventional digital image detector is classified into a direct type and an indirect type, depending on the manner of converting the X-rays into the electrical signals.

The conventional direct type digital X-ray image detector may obtain X-ray image information using only weak X-ray response properties of the X-ray receptor. For this, the X-ray receptor should be formed to be thick, and a high voltage should be applied through electrodes of both ends of the X-ray receptor in order to amplify the response properties. In addition, problems due to the use of harmful material and the difficulty in forming a large area are caused.

On the other hand, the conventional indirect type digital X-ray image detector employs a process of forming a light-receiving device in a unit cell structure constituting a substrate. However, such a detector suffers because it has low yield, the unit cell is difficult to manufacture, and high manufacturing cost is required. Further, the X-ray receptor is formed merely of a phosphor layer, thereby obtaining low signal detection and poor image quality and not benefiting from the direct response properties of X-rays.

DISCLOSURE OF INVENTION

Technical Problem

Accordingly, the present invention has been made keeping in mind the above problems of a conventional digital X-ray image detector occurring in the prior art, and an object of the present invention is to provide a novel high performance digital X-ray image detector that has a high image resolution and a large area, is easy to manufacture and process compared to conventional processes, and has excellent detection efficiency of electrical signals.

Technical Solution

In order to accomplish the above object, the present invention provides a digital X-ray image detector using an FED device, comprising an upper substrate and a lower substrate, which are disposed to face each other and are sealed; an anode formed beneath the upper substrate; a photoconductive layer formed beneath the anode for forming electron-hole pairs using X-rays; a cathode formed on the lower substrate; an emitter formed on the cathode for emitting electrons of the cathode; a gate electrode formed on an insulating layer that is provided around the emitter on the cathode for applying an electron emission control signal to the emitter such that the signal of the electron-hole pairs formed in the photoconductive layer by the X-rays is transferred to the anode; and a data processing part for receiving information about the electron-hole pairs formed in the photoconductive layer by the X-rays from the anode using electrons emitted through the emitter, and then converting the information of the electron-hole pairs to digital data through signal processing including filtering, amplification, storage, or A/D conversion.

The digital X-ray image detector using an FED device preferably further comprises a phosphor layer formed on or beneath the photoconductive layer for converting the X-rays into visible light.

In the digital X-ray image detector using an FED device, the emitter is preferably a Spindt-Tip formed on the cathode.

In addition, in the digital X-ray image detector using an FED device, the emitter is preferably a carbon nanotube formed on the cathode.

In addition, in the digital X-ray image detector using an FED device, the emitter and the insulating layer preferably constitute a planar emitter using conductive particles formed on the cathode.

In addition, in the digital X-ray image detector using an FED device, the phosphor layer is preferably formed of at least one phosphor material selected from the group consisting of CsI:Na; CsI:Tl; ZnS:Ag,Cl; ZnS:Cu,Al; $Y_2O_2S$:Eu; ZnS:Ag,Cl+CoO,$Al_2O_3$; $Y_2O_2S$:Eu+$Fe_2O_3$; $Y_2O_3$:Eu; ZnS:Ag,Al; $Zn_2SiO_5$:Mn; and $Y_2O_2S$:Tb.

ADVANTAGEOUS EFFECTS

According to the present invention, there is provided a novel high performance digital X-ray image detector that has a high image resolution and a large area, is easy to manufacture and process compared to conventional processes, and has excellent detection efficiency of electrical signals.

BRIEF DESCRIPTION OF THE DRAWINGS

FIG. 1 is a cross-sectional view showing a unit pixel of a digital X-ray image detector using an FED device, according to a first embodiment of the present invention;

FIG. 2 is a cross-sectional view showing a digital X-ray image detector using an FED device, which has a carbon nanotube type emitter, according to a second embodiment of the present invention;

FIG. 3 is a cross-sectional view showing a digital X-ray image detector using an FED device, which has a printed conductive particle type emitter, according to a third embodiment of the present invention;

FIG. 4 is a cross-sectional view showing the digital X-ray image detector using an FED device, which has a phosphor layer, according to the present invention;

FIG. 5 is a graph showing the signal state of the FED device; and

FIG. 6 is a graph showing the signal state of the digital X-ray image detector using an FED device of the present invention.

DESCRIPTION OF THE REFERENCE NUMERALS IN THE DRAWINGS

10: substrate
11: upper substrate
12: lower substrate
20: anode
30: cathode
35: emitter
40: gate electrode
45: insulating layer
50: photoconductive layer
55: phosphor layer
70: data processing part
200: electrons emitted through emitter

BEST MODE FOR CARRYING OUT THE INVENTION

Hereinafter, a detailed description will be given of the present invention with reference to the appended drawings.

FIG. 1 is a cross-sectional view showing a unit pixel of a digital X-ray image detector using an FED device, according to a first embodiment of the present invention, FIG. 2 is a cross-sectional view showing a digital X-ray image detector using an FED device, which has a carbon nanotube type emitter, according to a second embodiment of the present invention, FIG. 3 is a cross-sectional view showing a digital X-ray image detector using an FED device, which has a printed conductive particle type emitter, according to a third embodiment of the present invention, FIG. 4 is a cross-sectional view showing the digital X-ray image detector using an FED device, which has a phosphor layer, according to the present invention, FIG. 5 is a graph showing the signal state of the FED device, and FIG. 6 is a graph showing the signal state of the digital X-ray image detector using an FED device of the present invention.

The digital X-ray image detector of the present invention comprises an upper substrate 11, a lower substrate 12, a cathode 30, an emitter 35, an insulating layer 45, a gate electrode 40, an anode 20, a photoconductive layer 50, a phosphor layer 55, and a data processing part 70.

In the present invention, the FED device, which is a conventional display device, is used for an X-ray image detector. As shown in FIG. 1, the upper substrate 11 and the lower substrate 12 of the present invention constitute two substrates 10 in a sealed vacuum state disposed to face each other while having a predetermined space therebetween due to a spacer 60.

The cathode 30 of the present invention is formed on the lower substrate 12 in the space.

The emitter 35 is formed on the cathode 30, and the insulating layer 45 is formed around the emitter 35. Further, the gate electrode 40 for applying an electrical field to the emitter 35 is formed on the insulating layer 45.

The anode 20 of the present invention is formed beneath the upper substrate 11 in the space.

The photoconductive layer 50 for forming electron-hole pairs using X-rays is provided beneath the anode 20.

The space in a vacuum state is defined by the photoconductive layer 50, the gate electrode 40, and the emitter 35.

When X-rays are passed through the above substrate structure, the electron-hole pairs are formed in the photoconductive layer 50 by such X-rays, thereby obtaining a latent image of X-rays.

As in the FED shown in FIG. 5, when the gate signal is applied to the gate electrode 40 in the state of voltage being applied to the cathode 30, electrons 200 are emitted through the emitter 35 connected to the cathode 30, thus causing the flow of electrons 200 from the cathode 30 to the anode 20.

That is, the flow of the electrons 200 to the anode 20 is controlled by the gate signal, and the shape and magnitude of electron flow depend on the gate signal.

Further, as shown in FIG. 6, the electron-hole pairs, which are formed in the photoconductive layer 50 by X-rays, are transferred in the form of a latent image to the anode 20 by the gate signal, and thus regarded as an anode response to the gate signal applied to the unit pixel.

The condition for the anode response is controlled in order to output the response to the gate signal, depending on the voltage condition between the photoconductive layer and the cathode.

The data processing part 70 is connected to the anode 20.

The data processing part 70 includes a filter circuit portion for detecting the X-ray signal transferred to the anode 20.

The filter circuit portion functions to detect and output the anode response converted from the electron-hole pairs with respect to the anode response varying with the magnitude or shape of the gate signal applied to the unit pixel.

The throughput of the filter circuit portion is processed into digital image information data by a series of signal processing procedures including amplification, storage, or A/D conversion.

In this way, the data processing part 70 of the present invention functions to output the X-ray image using the latent image of the electron-hole pairs formed in the photoconductive layer 50 by X-rays as the source of the digital image.

In addition, it is preferred that the phosphor layer 55 be further formed beneath the photoconductive layer 50 so as to amplify the response sensitivity of the photoconductive layer to X-rays.

Since the photoconductive layer 50 has greater response sensitivity to visible light than to X-rays, X-rays are converted into visible light such that the photoconductive layer 50 responds to such visible light. Thereby, many electron-hole pairs are formed by even a small X-ray signal, thus greatly amplifying the X-ray sensitivity.

The phosphor layer 55 is formed of at least one phosphor material selected from the group consisting of CsI:Na; CsI:Tl; ZnS:Ag,Cl; ZnS:Cu,Al; $Y_2O_2S$:Eu; ZnS:Ag,Cl+CoO, $Al_2O_3$; $Y_2O_2S$:Eu+$Fe_2O_3$; $Y_2O_3$:Eu; ZnS:Ag,Al; $Zn_2SiO_5$:Mn; and $Y_2O_2S$:Tb.

As such, in addition to the electron-hole pairs formed in the photoconductive layer 50 by the X-rays 100 passing through the object, additional electron-hole pairs are also formed in the photoconductive layer 50 by light generated from the phosphor layer 55.

Such a phosphor layer 55 is used to convert the X-ray signal into visible light able to greatly amplify the sensitivity of the photoconductive layer 50, therefore realizing an X-ray image display device that can exhibit large sensitivity to weak X-rays.

In the present invention, the FED device for emitting electrons via the emitter 35 depending on the gate signal may be used without being limited to any one FED type.

For example, as shown in FIG. 1, the FED of the present invention includes an emitter having a Spindt-Tip structure formed of material that enables the generation of electrons by the electric field effect of silicon or molybdenum. In addition, as shown in FIG. 2, the FED may include carbon nanotubes 35-b provided on the cathode.

The emitter composed of the carbon nanotubes 35-b is provided by sequentially forming the cathode 30, the insulating layer 45, and the gate electrode 40 on the lower substrate 12, as in a general Spindt three-electrode electric field emission type FED shown in FIG. 1, making a hole through the gate electrode 40 and the insulating layer 45 using a photolithographic process, depositing a catalytic transition metal 35-a required for growing the carbon nanotube 35-b on the cathode 30 via evaporation, and growing the carbon nanotube 35-b on the catalytic transition metal 35-a.

Moreover, as shown in FIG. 3, the FED of the present invention may include a planar emitter 35-c using conductive particles, instead of the Spindt-Tip (which is designated as 35 in FIG. 1), on the cathode 30. In addition, various types of emitters for generating electrons using the electric field effect may be provided.

The planar emitter 35-c of FIG. 3 is formed in a manner such that the cathode 30 is provided on the lower substrate 12, and then conductive particles are contained in an organic insulating matrix formed of glass or silica using a printing process.

As mentioned above, when the X-rays 100 passed through any object are incident on the photoconductive layer 50, the electron-hole pairs are formed in the photoconductive layer 50 and electrical signals thereof are stored in the form of a latent image.

Meanwhile, the electrons are emitted through the emitter 35 depending on the operation of the gate electrode 40. In this case, the emitted electrons act to change the signal magnitude in proportion to the number of electron-hole pairs stored in the photoconductive layer 50. Such change in signal magnitude is output through the anode 20 after the electrons are emitted via the emitter 35.

To this end, the extent of response of the anode 20 should be controlled in order to respond to the gate signal, based on the signal of the photoconductive layer 50.

When the signal of the electron-hole pairs formed in the photoconductive layer 50 is read out from the anode 20 using the electrons emitted through the emitter, the signal is used as the source of the digital X-ray image signal through signal processing including detection (filtering), amplification, storage, etc.

Although the preferred embodiments of the digital X-ray image detector of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A digital X-ray image detector using an FED device, comprising:
    an upper substrate and a lower substrate, which are disposed to face each other and are sealed;
    an anode formed beneath the upper substrate;
    a photoconductive layer formed beneath the anode for forming electron-hole pairs using X-rays;
    a phosphor layer formed beneath the photoconductive layer such that the photoconductive layer is located between the anode and the phosphor layer, and configured to convert the X-rays into visible light;
    a cathode formed on the lower substrate;
    an emitter formed on the cathode for emitting electrons of the cathode;
    a gate electrode formed on an insulating layer that is provided around the emitter on the cathode, the gate electrode configured to apply an electron emission control signal to the emitter such that a signal of the electron-hole pairs formed in the photoconductive layer by the X-rays is transferred to the anode; and
    a data processing part configured to receive information about the electron-hole pairs formed in the photoconductive layer by the X-rays from the anode using the electrons emitted through the emitter, and then to convert the information about the electron-hole pairs to digital data through signal processing including filtering, amplification, storage, or A/D conversion.

2. The digital X-ray image detector according to claim 1, wherein the photoconductive layer is closer to the emitter than the anode is to the emitter.

3. The digital X-ray image detector according to claim 1, wherein the emitter is a Spindt-Tip formed on the cathode.

4. The digital X-ray image detector according to claim 1, wherein the emitter is a carbon nanotube formed on the cathode.

5. The digital X-ray image detector according to claim 1, wherein the emitter and the insulating layer constitute a planar emitter using conductive particles formed on the cathode.

6. The digital X-ray image detector according to claim 1, wherein the phosphor layer is formed of at least one phosphor material selected from the group consisting of CsI:Na; CsI:Tl; ZnS:Ag,Cl; ZnS:Cu,Al; $Y_2O_2S$:Eu; ZnS:Ag,Cl+CoO, $Al_2O_3$; $Y_2O_2S$:Eu+$Fe_2O_3$; $Y_2O_3$:Eu; ZnS:Ag,Al; $Zn_2SiO_5$:Mn; and $Y_2O_2S$:Tb.

7. The digital X-ray image detector according to claim 1, wherein the electron-hole pairs formed in the photoconductive layer by the X-rays are transferred in a form of a latent image to the anode by a gate signal applied to the gate electrode.

8. A digital X-ray image detector using an FED device, comprising:
    an upper substrate and a lower substrate, which are spaced apart from each other;
    an anode formed on the upper substrate;
    a photoconductive layer formed on the anode for forming a photoconductive signal using X-rays;
    a cathode formed on the lower substrate;
    an emitter formed on the cathode for emitting electrons of the cathode;
    a gate electrode formed on an insulating layer, the gate electrode configured to apply an electron emission control signal to the emitter such that the photoconductive signal formed in the photoconductive layer by the X-rays is transferred to the anode; and
    a data processing part configured to receive information about the photoconductive signal formed in the photoconductive layer by the X-rays from the anode using the electrons emitted through the emitter, and then to convert the information about the photoconductive signal to digital data,
    wherein the emitted electrons from the cathode directly contact the photoconductive layer.

9. The digital X-ray image detector according to claim 8, wherein the emitter is a Spindt-Tip formed on the cathode.

10. The digital X-ray image detector according to claim 8, wherein the emitter is a carbon nanotube formed on the cathode.

11. The digital X-ray image detector according to claim 8, wherein the emitter and the insulating layer constitute a planar emitter using conductive particles formed on the cathode.

12. The digital X-ray image detector according to claim 8, further comprising a phosphor layer is formed of at least one phosphor material selected from the group consisting of CsI:Na; CsI:Tl; ZnS:Ag,Cl; ZnS:Cu,Al; $Y_2O_2S$:Eu; ZnS:Ag,Cl+CoO,$Al_2O_3$; $Y_2O_2S$:Eu+$Fe_2O_3$; $Y_2O_3$:Eu; ZnS:Ag,Al; $Zn_2SiO_5$:Mn; and $Y_2O_2S$:Tb.

13. The digital X-ray image detector according to claim 8, wherein the photoconductive signal formed in the photoconductive layer by the X-rays is transferred in a form of a latent image to the anode by a gate signal applied to the gate electrode.

* * * * *